US012645117B2

(12) United States Patent
Cheng

(10) Patent No.: US 12,645,117 B2
(45) Date of Patent: Jun. 2, 2026

(54) POLYMER LIQUID CRYSTAL DIMMING BOX, MANUFACTURING METHOD THEREOF, AND DISPLAY MODULE

(71) Applicant: Wuhan China Star Optoelectronics Technology Co., Ltd., Wuhan (CN)

(72) Inventor: Wei Cheng, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 139 days.

(21) Appl. No.: 18/373,329

(22) Filed: Sep. 27, 2023

(65) Prior Publication Data

US 2024/0402539 A1     Dec. 5, 2024

(30) Foreign Application Priority Data

May 31, 2023     (CN) .......................... 202310644038.1

(51) Int. Cl.
*G02F 1/1337*          (2006.01)
*G02F 1/1335*          (2006.01)

(52) U.S. Cl.
CPC .. *G02F 1/133711* (2013.01); *G02F 1/133512* (2013.01); *G02F 1/133788* (2013.01)

(58) Field of Classification Search
CPC ......... G02F 1/133711; G02F 1/133512; G02F 1/133788; G02F 1/1334
See application file for complete search history.

(56) References Cited

U.S. PATENT DOCUMENTS

| | | | |
|---|---|---|---|
| 7,868,990 B2 | 1/2011 | Chan et al. | |
| 9,030,631 B2 | 5/2015 | Xu | |

| | | | | |
|---|---|---|---|---|
| 2004/0160566 A1 | 8/2004 | Kawabe et al. | | |
| 2014/0139798 A1* | 5/2014 | Xu | ..................... | G02F 1/133512 216/23 |
| 2021/0080779 A1* | 3/2021 | Liu | .................... | G02F 1/133512 |
| 2021/0325720 A1* | 10/2021 | Yu | ..................... | G02F 1/133788 |

(Continued)

FOREIGN PATENT DOCUMENTS

| | | |
|---|---|---|
| CN | 101285969 | 10/2008 |
| CN | 102967966 | 3/2013 |
| CN | 103852932 | 6/2014 |

(Continued)

OTHER PUBLICATIONS

CN_114167630, machine translation (Year: 2022).*

(Continued)

*Primary Examiner* — Tracie Y Green

(57)          ABSTRACT

A polymer liquid crystal dimming box, a manufacturing method thereof, and a display module are provided. The polymer liquid crystal dimming box includes a first substrate, a second substrate, a polymer liquid crystal layer, a frame adhesive layer and a light-shielding structure. The light-shielding structure is disposed between the frame adhesive layer and the polymer liquid crystal layer and surrounds the polymer liquid crystal layer. The light-shielding structure is used to absorb ultraviolet light obliquely incident during the curing process of the frame adhesive layer. In this way, the problem that the polymer liquid crystal layer is cured in advance due to ultraviolet light irradiation can be avoided, the edge failure of the polymer liquid crystal dimming box can be improved, which is conducive to mass production.

16 Claims, 6 Drawing Sheets

1

(56)         References Cited

U.S. PATENT DOCUMENTS

2025/0085584 A1 *   3/2025   Liang ............... G02F 1/133512

FOREIGN PATENT DOCUMENTS

| | | | | |
|---|---|---|---|---|
| CN | 109375409 | | 2/2019 | |
| CN | 114167630 A | * | 3/2022 | ......... G02F 1/13398 |
| CN | 114527588 | | 5/2022 | |
| CN | 114527588 A | * | 5/2022 | ........... G02F 1/1334 |
| JP | 2003-315810 | | 11/2003 | |
| TW | 201100912 | | 1/2011 | |

OTHER PUBLICATIONS

CN_114527588, machine translation (Year: 2022).*
Notification of Office Action and Search Report Dated Jan. 14, 2025 From The State Intellectual Property Office of the People's Republic of China Re. Application No. 202310644038.1 and Its Translation Into English. (15 Pages).
Notification of Office Action Dated Feb. 28, 2025 From The State Intellectual Property Office of the People's Republic of China Re. Application No. 202310644038.1 and Its Translation Into English. (12 Pages).

\* cited by examiner

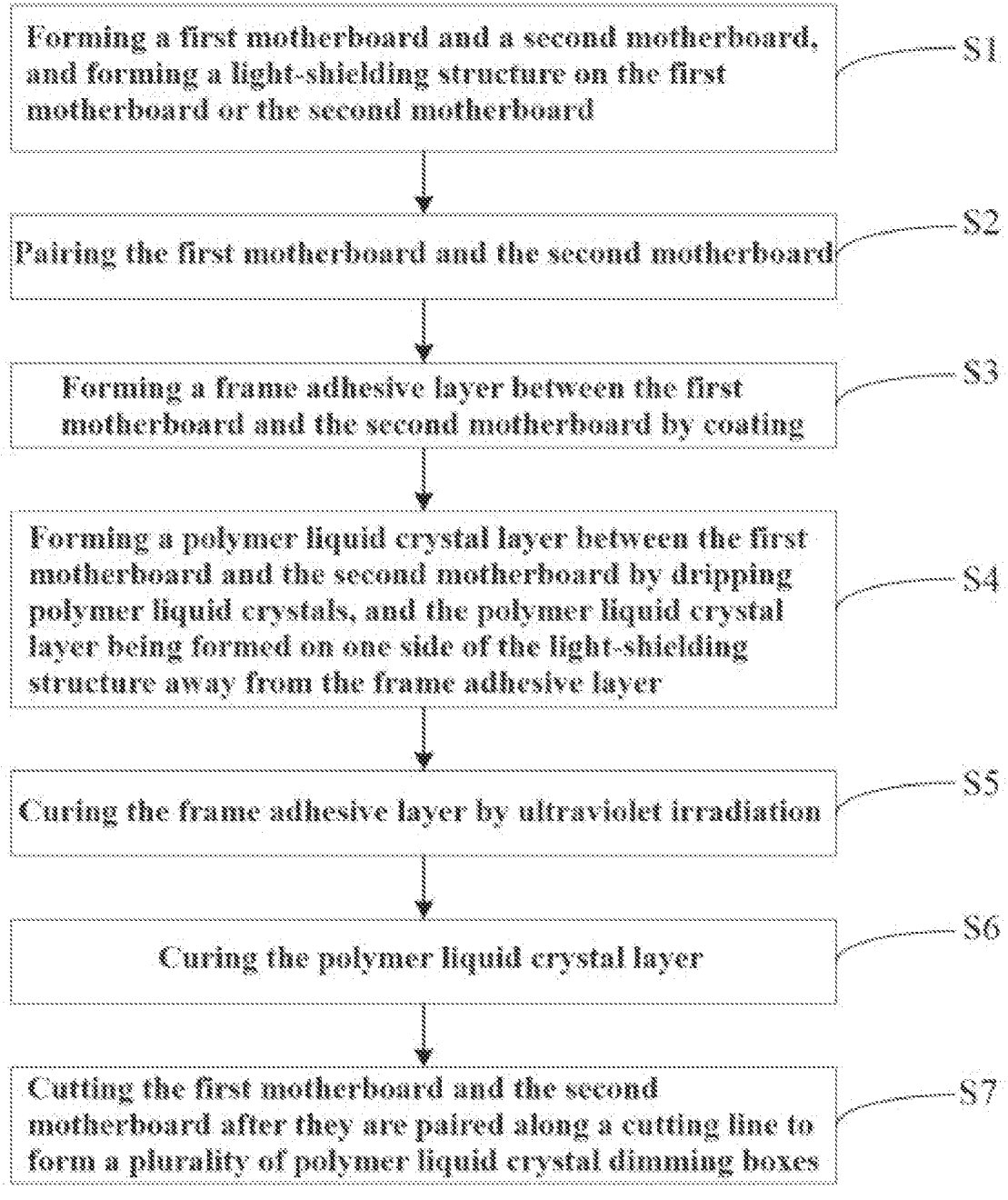

Forming a first motherboard and a second motherboard, and forming a light-shielding structure on the first motherboard or the second motherboard ⟶ S1

Pairing the first motherboard and the second motherboard ⟶ S2

Forming a frame adhesive layer between the first motherboard and the second motherboard by coating ⟶ S3

Forming a polymer liquid crystal layer between the first motherboard and the second motherboard by dripping polymer liquid crystals, and the polymer liquid crystal layer being formed on one side of the light-shielding structure away from the frame adhesive layer ⟶ S4

Curing the frame adhesive layer by ultraviolet irradiation ⟶ S5

Curing the polymer liquid crystal layer ⟶ S6

Cutting the first motherboard and the second motherboard after they are paired along a cutting line to form a plurality of polymer liquid crystal dimming boxes ⟶ S7

FIG. 6

POLYMER LIQUID CRYSTAL DIMMING BOX, MANUFACTURING METHOD THEREOF, AND DISPLAY MODULE

CROSS-REFERENCE TO RELATED APPLICATION

This application claims the benefit of priority to Chinese Patent Application No. 202310644038.1, filed on May 31, 2023, the contents of which are incorporated by reference as if fully set forth herein in their entirety.

TECHNICAL FIELD

The present disclosure relates to the field of display technologies, and in particular, to a polymer liquid crystal dimming box, a manufacturing method thereof, and a display module.

BACKGROUND

With the development of information technology, people pay more and more attention to personal information privacy, and anti-peeping display devices have emerged as the times require. In the case that a polymer liquid crystal dimming box is used in anti-peeping display device, it can freely switch between privacy mode and sharing mode to meet the needs of consumers in different occasions.

In order to realize mass production of polymer liquid crystal dimming boxes, polymer liquid crystals are generally prepared by liquid crystal drop filling process. The frame adhesive and the polymer liquid crystals need to be cured step by step to ensure that the polymer liquid crystals close to the frame glue does not undergo cross-linking reactions in advance. However, when curing the frame adhesive, ultraviolet (UV) light will be incident on the polymer liquid crystals at an angle at the edge of the light-shielding area of a UV mask. The polymer liquid crystals will be cured in advance after being irradiated by UV light. As a result, the corresponding inclined structure cannot be formed in the subsequent polymer liquid crystal curing process, thereby causing edge failure of the polymer liquid crystal box.

SUMMARY

In view of the above, embodiments of the present disclosure provide a polymer liquid crystal dimming box, a manufacturing method thereof, and a display module, which can solve the technical problem of edge failure of an existing polymer liquid crystal dimming box.

Some embodiments of the present disclosure provide a polymer liquid crystal dimming box, which includes:

a first substrate;

a second substrate disposed opposite to the first substrate;

a polymer liquid crystal layer disposed between the first substrate and the second substrate;

a frame adhesive layer disposed between the first substrate and the second substrate; and a light shielding structure disposed between the frame adhesive layer and the polymer liquid crystal layer and surrounding the polymer liquid crystal layer.

According to the polymer liquid crystal dimming box provided in the embodiments of the present disclosure, opposite side surfaces of the light-shielding structure in a stacking direction of the first substrate and the second substrate are in contact with the first substrate and the second substrate, respectively.

According to the polymer liquid crystal dimming box provided in the embodiments of the present disclosure, the light-shielding structure includes a plurality of light-shielding pillars disposed at intervals, each of the light-shielding pillars is annular and surrounds the polymer liquid crystal layer.

According to the polymer liquid crystal dimming box provided in the embodiments of the present disclosure, at least one supporting pillar is further disposed between the first substrate and the second substrate, the supporting pillar is disposed in the polymer liquid crystal layer, and the supporting pillar and the plurality of light-shielding pillars are disposed in the same layer.

According to the polymer liquid crystal dimming box provided in the embodiments of the present disclosure, the polymer liquid crystal dimming box further includes a dielectric layer filled between two adjacent ones of plurality of light-shielding pillars, wherein a refractive index of the dielectric layer is greater than a refractive index of the first substrate.

According to the polymer liquid crystal dimming box provided in the embodiments of the present disclosure, an optical density range of the light-shielding structure is greater than 2, and an optical density range of each of the plurality of light-shielding pillars is greater than 1.

According to the polymer liquid crystal dimming box provided in the embodiments of the present disclosure, the light-shielding structure includes a first light-shielding layer close to the liquid crystal layer and a second light-shielding layer close to the frame adhesive layer, the first light-shielding layer includes a plurality of first light-shielding pillars disposed at intervals, the second light-shielding layer includes a plurality of second light-shielding pillars disposed at intervals, and the plurality of first light-shielding pillars and the plurality of first light-shielding pillars are alternately disposed.

According to the polymer liquid crystal dimming box provided in the embodiments of the present disclosure, the light-shielding structure is in contact with the frame adhesive layer.

According to the polymer liquid crystal dimming box provided in the embodiments of the present disclosure, the frame adhesive layer is transparent.

Embodiments of the present disclosure provide a method for manufacturing a polymer liquid crystal dimming box, including steps of:

forming a first motherboard and a second motherboard, and forming a light-shielding structure on the first motherboard or the second motherboard;

pairing the first motherboard and the second motherboard;

forming a frame adhesive layer between the first motherboard and the second motherboard by coating;

forming a polymer liquid crystal layer between the first motherboard and the second motherboard by dripping polymer liquid crystals, and the polymer liquid crystal layer being formed on one side of the light-shielding structure away from the frame adhesive layer;

curing the frame adhesive layer by ultraviolet irradiation;

curing the polymer liquid crystal layer; and cutting the first motherboard and the second motherboard after they are paired along a cutting line to form a plurality of polymer liquid crystal dimming boxes.

According to the method for manufacturing a polymer liquid crystal dimming box according to embodiments of the present disclosure, the method further includes providing a UV mask, and disposing the UV mask on one side of the polymer liquid crystal dimmer box;

The UV mask includes a light-shielding area and a light-transmitting area, the light-shielding area at least corresponds to an area where the polymer liquid crystal layer and the light-shielding structure are located, and the light-transmitting area corresponds to an area where the frame adhesive layer is located; and the UV mask further includes a substrate, and a light refraction layer and a light-shielding layer disposed on the substrate, wherein the light refraction layer is disposed in the light-transmitting area, the light-shielding layer is disposed in the light-shielding area, and a refractive index of the light refraction layer is greater than 1.

Embodiments of the present disclosure provides a display module, which includes:

a display panel; and the polymer liquid crystal dimming box disposed on a light-emitting side of the display panel.

According to the polymer liquid crystal dimming box, the manufacturing method, and the display module of provided in the embodiments of the present disclosure, a light-shielding structure is disposed between a frame adhesive layer and a polymer liquid crystal layer, and the light-shielding structure surrounds the polymer liquid crystal layer, so as to absorb ultraviolet light obliquely incident during the curing process of the frame adhesive layer. In this way, the problem that the polymer liquid crystal layer is cured in advance due to ultraviolet light irradiation can be avoided, the edge failure of the polymer liquid crystal dimming box can be improved, which is conducive to mass production.

BRIEF DESCRIPTION OF THE DRAWINGS

In order to more clearly describe the technical solutions in the embodiments of the present disclosure, hereinafter, the appended drawings used for describing the specific embodiments will be briefly introduced. Apparently, the appended drawings described below are only directed to some embodiments of the present disclosure, and for a person skilled in the art, without expenditure of creative labor, other drawings can be derived on the basis of these appended drawings.

FIG. 6 is a flowchart of a method for manufacturing a polymer liquid crystal dimming box according to some embodiments of the present disclosure.

LIST OF REFERENCE SIGNS

1. Polymer liquid crystal dimming box; 2. UV mask; 3. display panel;

20. substrate; 21. light-shielding area; 22. light-transmitting area; 23. light refraction layer; 24. light-shielding layer; 241. black low-refraction metal layer; 242. black antireflective layer; 25. virtual light-shielding block;

10. first substrate; 11. second substrate; 12. polymer liquid crystal layer; 121. polymer liquid crystal molecules; 13. frame adhesive layer; 14. Light-shielding structure; 141. light-shielding pillar; 142. first light-shielding layer; 143. second light-shielding layer; 144. first light-shielding pillar; 145. second light-shielding pillar; and

15. supporting pillar; 151. main supporting pillar; 16. dielectric layer; 17. virtual supporting pillar; 18. signal wiring; 19. cutting area; 100. first motherboard; 110. second motherboard.

DETAILED DESCRIPTION

Hereinafter, technical solution in embodiments of the present disclosure will be clearly and completely described with reference to the accompanying drawings in embodiments of the present disclosure. Obviously, the described embodiments are part of, but not all of, the embodiments of the present disclosure. All the other embodiments, obtained by a person with ordinary skill in the art on the basis of the embodiments in the present disclosure without expenditure of creative labor, belong to the protection scope of the present disclosure.

In the description of the present disclosure, it should be noted that, terms such as "length", "width", "thickness", "up", "down" refer to the orientation or positional relationship based on the illustration of the appended drawings, and are only for the purpose of facilitating and simplifying the description of the present disclosure, rather than indicating or implying that the apparatus or component referred to must have a particular orientation or must be configured or operated in a particular orientation, therefore should not be construed as a limitation towards the present disclosure. Further, in the description of the present disclosure "a plurality of" means two or more, unless expressly and exemplarily defined otherwise.

In the present disclosure, unless specified and limited otherwise, a first feature "on" or "under" a second feature may include direct contact of the first feature and the second feature, and it may also be included that the first feature and the second feature are not in direct contact but are contacted by additional features between them.

The embodiments of the present disclosure provide a polymer liquid crystal dimming box, a manufacturing method thereof, and a display module. Detailed descriptions are given below. It should be noted that the order in which the following embodiments are described is not intended to limit the preferred order of the embodiments.

Figures 1, 2:
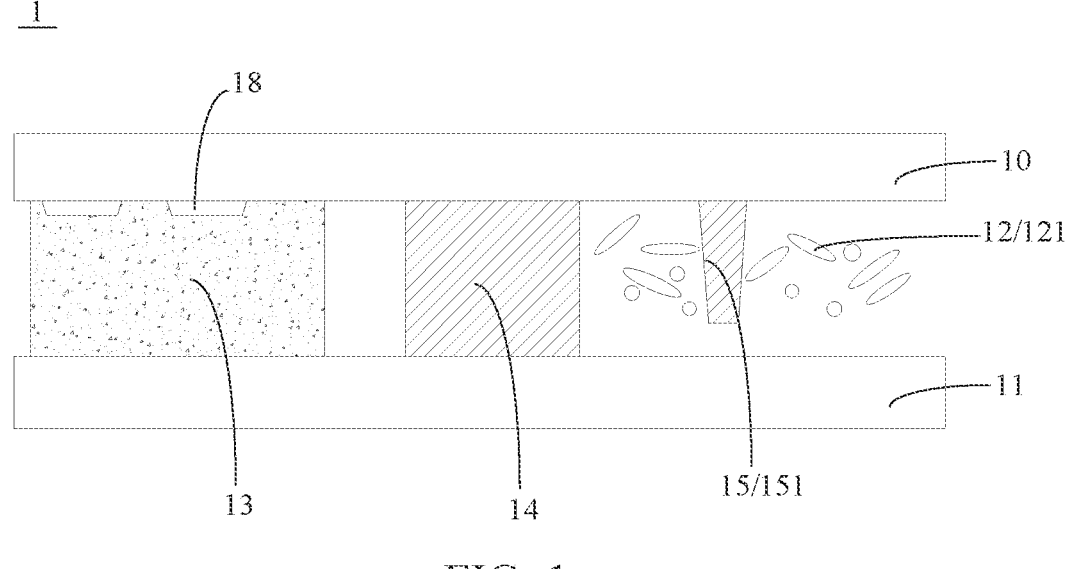
FIG. 1 is a schematic diagram of a polymer liquid crystal dimmer box in a first configuration according to some embodiments of the present disclosure.
FIG. 2 is a schematic diagram of a polymer liquid crystal dimmer box in a second configuration according to some embodiments of the present disclosure.

Referring to FIG. 1, embodiments of the present disclosure provide a polymer liquid crystal dimming box 1 including a first substrate 10, a second substrate 11, a polymer liquid crystal layer 12, a frame adhesive layer 13, and a light-shielding structure 14.

The second substrate 11 is disposed opposite to the first substrate 10. The polymer liquid crystal layer 12 is disposed between the first substrate 10 and the second substrate 11. The frame adhesive layer 13 is disposed between the first substrate and the second substrate 11. The light-shielding structure 14 is disposed between the frame adhesive layer 13 and the polymer liquid crystal layer 12 and surrounds the polymer liquid crystal layer 12.

In the present disclosure, the light-shielding structure 14 is used to absorb ultraviolet light obliquely incident during the curing process of the frame adhesive layer 13. In this way, the problem that the polymer liquid crystal layer 12 is cured in advance due to ultraviolet light irradiation can be avoided, the edge failure of the polymer liquid crystal dimming box 1 can be improved, which is conducive to mass production.

The polymer liquid crystal layer 12 includes a plurality of polymer liquid crystal molecules 121 distributed in a polymer three-dimensional network to form a continuous channel network. A voltage is applied to the first substrate 10 and the second substrate 11, and viewing angle adjustment function is realized by using phase adjustment of polarized light in a voltage-off state and a voltage-on state, as well as transparent state and fog state switching characteristics, thereby realizing free switching between a privacy mode and a sharing mode. Exemplarily, the polymer liquid crystal molecules 121 include a plurality of liquid crystal molecules and a plurality of polymer small molecules.

Exemplarily, the polymer liquid crystal dimming box 1 further includes a first alignment layer (not shown in the figure) and a second alignment layer (not shown in the figure). The first alignment layer is disposed on one side of the first substrate 10 close to the polymer liquid crystal layer 12. The second alignment layer is disposed on one side of the second substrate 11 close to the polymer liquid crystal layer 12. The polymer liquid crystal molecules 121 are oriented by the first alignment layer and the second alignment layer.

It should be noted that the first substrate 10 and the second substrate 11 are one of an array substrate and a color film substrate, respectively. In a case, the first substrate 10 may be an array substrate and the second substrate 11 may be a color film substrate. In another case, the first substrate 10 may be a color film substrate and the second substrate 11 may be an array substrate. The first substrate 10 and the second substrate 11 may be designed based on the prior art according to actual requirements, and are not limited herein. In the embodiments of the present disclosure, in order to clearly explain the technical solutions, the present disclosure is described by taking an example that the first substrate 10 is an array substrate and the second substrate 11 is a color film substrate.

Exemplarily, the polymer liquid crystal dimmer 1 includes a display area and a non-display area surrounding the display area. The non-display area includes a frame adhesive area and a peripheral circuit area, and the peripheral circuit area is disposed between the frame adhesive area and the display area. In the embodiments of the present disclosure, the polymer liquid crystal layer 12 is disposed in the display area, the frame adhesive layer 13 is disposed in the frame adhesive area, and the light-shielding structure 14 is disposed in the peripheral circuit area. The peripheral circuit area and the frame adhesive area include a plurality of signal wirings 18, and the light-shielding structure 14 should avoid the signal wirings 18 to avoid undesirable effects on signal transmission.

Optionally, the light-shielding structure 14 is any one of a black light-absorbing structure, a metal reflective structure, and a transparent light-guiding structure.

In the embodiments of the present disclosure, opposite side surfaces of the light-shielding structure 14 in a stacking direction of the first substrate 10 and the second substrate 11 are in contact with the first substrate 10 and the second substrate 11, respectively. In this way, there is no gap between the light-shielding structure 14 and the first substrate 10 and the second substrate 11, so that ultraviolet light obliquely incident during the curing process of the frame adhesive layer 13 that is not absorbed by the light-shielding structure 14 can pass through the gaps and irradiates the polymer liquid crystal layer 12 in the case that there are gaps. In this way, the ultraviolet light obliquely incident during the curing process of the frame adhesive layer 13 can be irradiated onto the light-shielding structure 14 as much as possible and absorbed by the light-shielding structure 14, so as to improve the light absorption efficiency of the light-shielding structure 14, thereby reducing the risk of edge failure of the polymer liquid crystal box, and improving the edge failure of the polymer liquid crystal box 1.

In some embodiments of the present disclosure, from a top view, the light-shielding structure 14 is in the form of a sheet structure as a whole, and the light-shielding structure 14 adopting this structure can obtain higher light absorption efficiency.

In some embodiments of the present disclosure, please refer to FIG. 2, which differs from FIG. 1 in that, from a top view angle, the light-shielding structure 14 includes a plurality of light-shielding pillars 141 disposed at intervals, each of the plurality of light-shielding pillars 141 is annular, and opposite end surfaces of each of the plurality of light-shielding pillars 141 are in contact with the first substrate 10 and the second substrate 11, respectively.

Exemplarily, the polymer liquid crystal dimming box 1 is generally provided with a plurality of supporting pillars 15 for supporting a predetermined thickness of the box. The plurality of supporting pillars 15 are disposed between the first substrate 10 and the second substrate 11 and are disposed within the polymer liquid crystal layer 12. In the embodiments of the present disclosure, the plurality of supporting pillars 15 and the plurality of light-shielding pillars 141 are disposed in the same layer, that is, the plurality of supporting pillars 15 and the plurality of light-shielding pillars 141 can be manufactured by using the same process, thereby reducing the manufacturing process and reducing production costs.

Exemplarily, the supporting pillars 15 includes main supporting pillars 151 and auxiliary supporting pillars (not shown). The height of a main supporting pillar 151 is greater than that of an auxiliary supporting pillar. Opposite end surfaces of a supporting pillars 15 are in contact with the first substrate 10 and the second substrate 11, respectively. The supporting pillars 15 play the main supporting role and support a certain height. The auxiliary supporting pillars play an auxiliary supporting role in the case that the polymer liquid crystal dimming box 1 is squeezed by external force to relieve the supporting pressure of the main supporting pillars 151. In embodiments of the present disclosure, the light-shielding pillars 141 and the main supporting pillars 151 are manufactured by the same process. Exemplarily, the height of the light-shielding pillar is the same as the height of the main supporting pillar 151.

Optionally, the number of the light-shielding pillars 141 may be three, four, five, or more, and the specific number should be adjusted according to actual conditions, which is not limited herein. Exemplarily, the number of the light-shielding pillars 141 is three.

Optionally, the cross-sectional shape of the light-shielding pillar 141 in the thickness direction may be any one of a trapezoid, a square, a rhombus, a rectangle, and an irregular shape. Exemplarily, the cross-sectional shape of the light-shielding pillar 141 in the thickness direction is a trapezoid, and the area of the side of the light-shielding pillar 141 close to the first substrate 10 is greater than the area of the side of the light-shielding pillar 141 close to the first substrate 10.

Exemplarily, the light-shielding pillar 141 may be formed on the first substrate 10, or may be formed on the second substrate 11. In the embodiments of the present disclosure, it is illustrated by taking an example that the light-shielding pillar 141 is formed on the first substrate 10, that is, the light-shielding pillar 141 is formed on the array substrate.

Exemplarily, compared to the fact that the light-shielding structure 14 has an annular structure as a whole, if there are gaps between two adjacent light-shielding pillars 141, the ultraviolet light obliquely incident during the curing process of the frame adhesive layer 13 can easily pass through the gaps between two adjacent light-shielding pillars 141 and irradiate onto the polymer liquid crystal layer 12.

Figure 3:
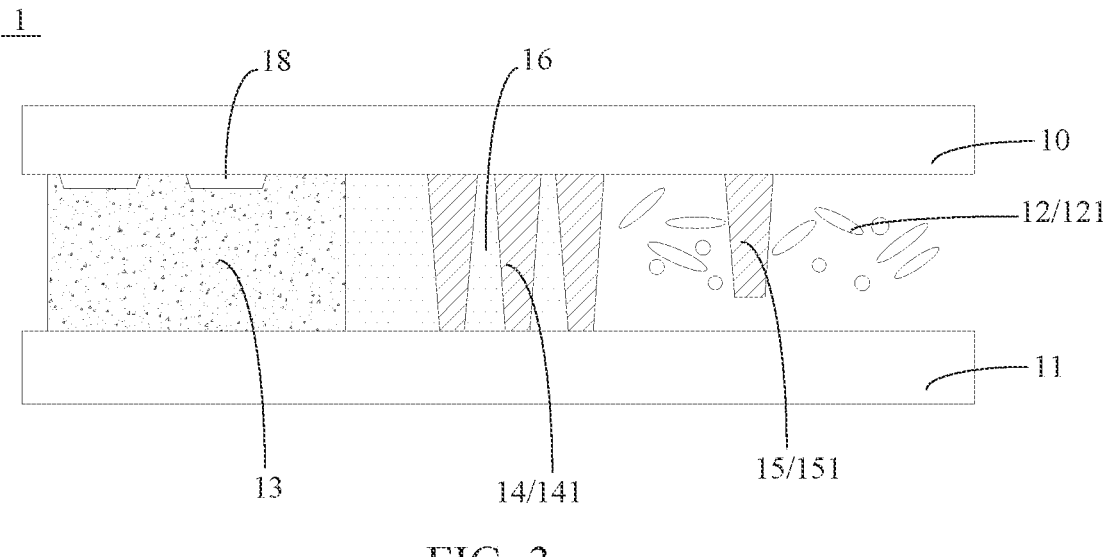
FIG. 3 is a schematic diagram of a polymer liquid crystal dimmer box in a third configuration according to some embodiments of the present disclosure.

In view of this, please refer to FIG. 3, which differs from FIG. 2 in that in this embodiment, the polymer liquid crystal dimming box 1 further includes a dielectric layer 16 filled between two adjacent light-shielding pillars 141, and the refractive index of the dielectric layer 16 is greater than the refractive index of the first substrate 10. In this way, in the case that the ultraviolet light obliquely incident during the curing process of the frame adhesive layer 13 passes through the gaps between two adjacent light-shielding pillars 141, since the dielectric layer 16 has a higher refractive index than the light-shielding pillar 141, and the property that light is directed from an optically thinner medium to an optically denser medium, an incident angle is less than a refraction angle, the ultraviolet light is refracted at edges of the first substrate 10 and the dielectric layer 16, so that the ultraviolet light is irradiated into one of the light-shielding pillars 141 adjacent to and close to the polymer liquid crystal layer 12 and is absorbed by the first substrate 10, thereby avoiding the ultraviolet light from irradiating the polymer liquid crystal layer 12, thus further reducing the risk of edge failure of the polymer liquid crystal box.

Exemplarily, the optical density range of the light-shielding structure 14 is greater than 2, and the optical density range of each of the plurality of light-shielding pillars 141 is greater than 1.

In some embodiments of the present disclosure, considering the coating accuracy, there are gaps between the light-shielding structure 14 and the frame adhesive layer 13. Further, the dielectric layer 16 may be filled in the gaps to narrow the oblique angle of the ultraviolet light.

Figure 4:
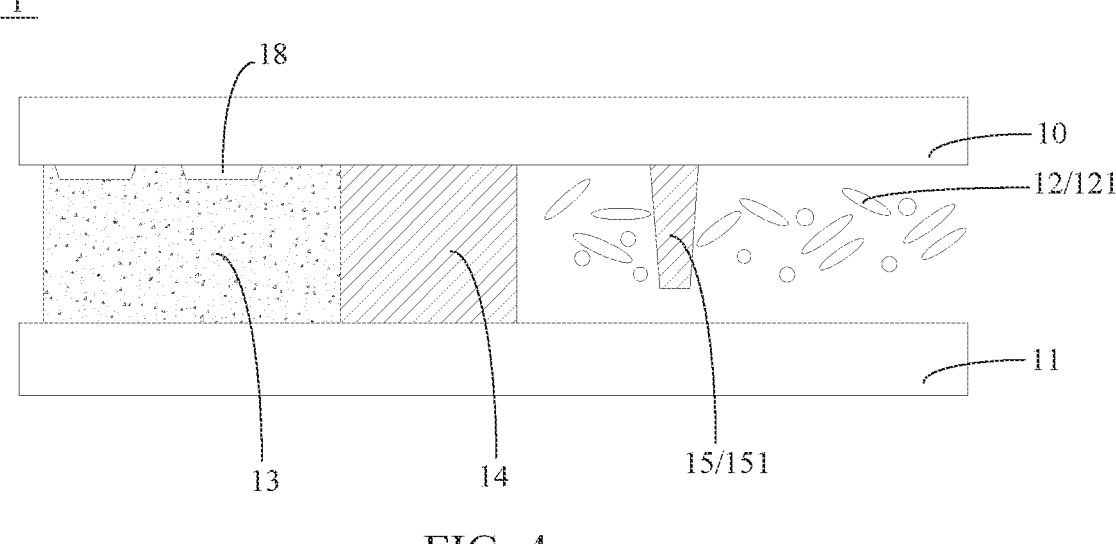
FIG. 4 is a schematic diagram of a polymer liquid crystal dimmer box in a fourth configuration according to some embodiments of the present disclosure.

Referring to FIG. 4, which differs from FIG. 1 in that, in some embodiments of the present disclosure, if coating accuracy can be guaranteed or the coating accuracy is not considered, the light-shielding structure 14 and the frame adhesive layer 13 can also be in direct contact to prevent the obliquely incident ultraviolet light from passing through the gaps between the light-shielding structure 14 and the frame adhesive layer 13 during the curing process of the frame adhesive layer 13 and irradiating the polymer liquid crystal layer 12, thereby improving the light absorption efficiency of the light-shielding structure 14, and further reducing the light absorption efficiency of the frame adhesive layer 13.

It should be noted that the frame adhesive layer 13 may be a black frame adhesive. By setting the frame adhesive layer 13 to be black, the ultraviolet light injected during the curing process of the frame adhesive layer 13 can be absorbed by using the light absorption characteristics of the black frame adhesive layer 13, so as to improve the problem that the polymer liquid crystal is cured in advance. However, it should be known that the applicant notices that the black frame adhesive absorbs ultraviolet light during the curing process, which can easily lead to incomplete curing and cause peeling. Based on this, in the embodiments of the present disclosure, the frame adhesive layer 13 can be transparent, and the frame adhesive layer 13 is completely cured, and peeling is not easy to be caused. At the same time, referring to the related description in the above embodiments, in this embodiment, the ultraviolet light obliquely incident during the curing process of the frame adhesive layer 13 can absorbed by using the light-shielding structure 14. Even if the frame adhesive layer 13 is set to be transparent, the problem that the polymer liquid crystal is cured in advance can be improved. Therefore, in the embodiments of the present disclosure, problems of incomplete curing of the frame adhesive layer 13 and edge failure of the polymer liquid crystal box can be solved simultaneously, which is beneficial to the realization of mass production.

Figure 5:
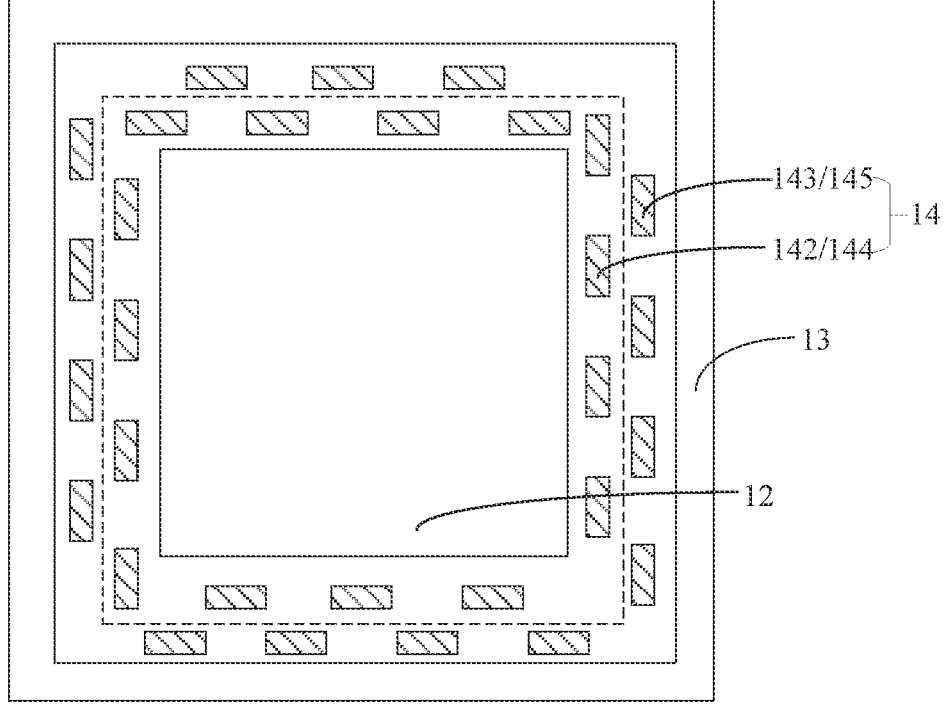
FIG. 5 is a schematic top view of a polymer liquid crystal dimmer box according to some embodiments of the present disclosure.

Referring to FIG. 5, the light-shielding structure 14 includes a first light-shielding layer 142 close to the liquid crystal layer 12 and a second light-shielding layer 143 close to the frame adhesive layer 13. The first light-shielding layer 142 includes a plurality of first light-shielding pillars 144 disposed at intervals, and the second light-shielding layer 143 includes a plurality of second light-shielding pillars 145 disposed at intervals. The plurality of first light-shielding pillars 144 and the plurality of second light-shielding pillars 145 are alternately disposed, so as to prevent the obliquely incident ultraviolet light from easily passing through two adjacent first light-shielding pillars 143 and two adjacent second light-shielding pillars 145 during the curing process of the frame adhesive layer 13 and irradiating the polymer liquid crystal layer 12.

Figures 7, 8:
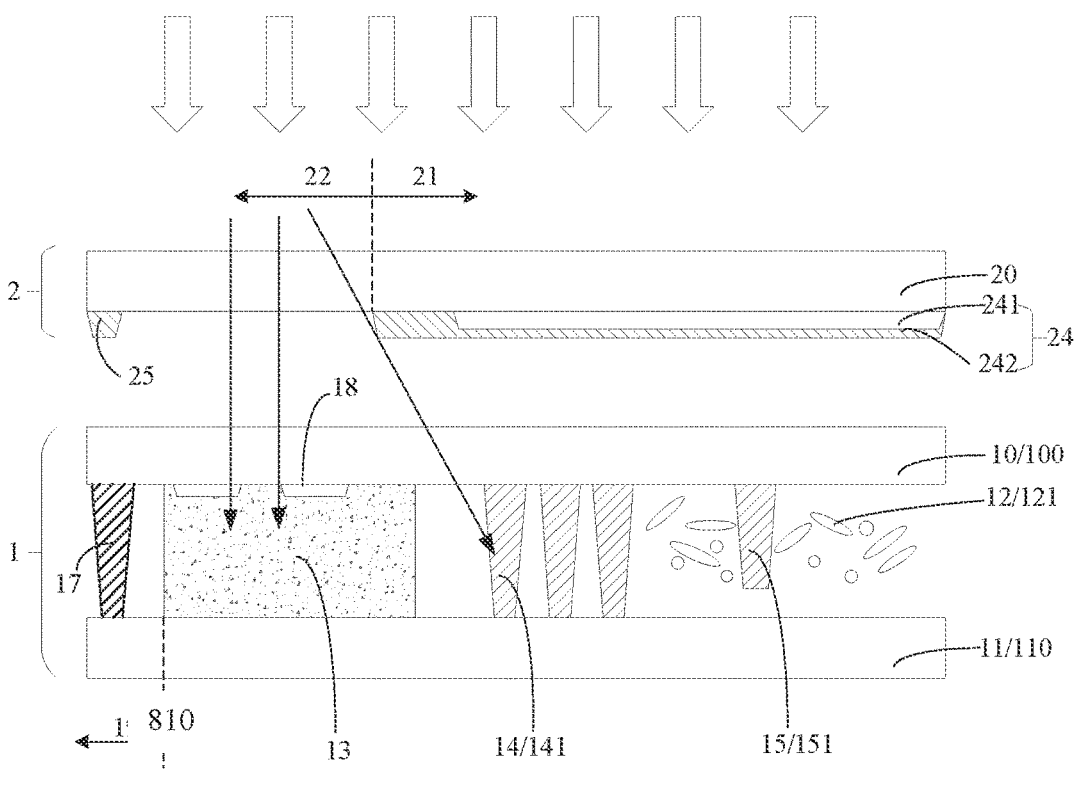
FIG. 7 is a first schematic structural diagram showing a curing process of the frame adhesive layer of the polymer liquid crystal dimming box according to some embodiments of the present disclosure.
FIG. 8 is a second schematic structural diagram showing a curing process of the frame adhesive layer of the polymer liquid crystal dimming box according to some embodiments of the present disclosure.

Referring to FIGS. 6 to 8, embodiments of the present disclosure further provide a method for manufacturing a polymer liquid crystal dimming box 1, which includes steps as follows:

Step S1: forming a first motherboard 100 and a second motherboard 110, and forming a light-shielding structure 14 on the first motherboard 100 or the second motherboard 110.

Step S2: pairing the first motherboard 100 and the second motherboard 200.

Exemplarily, the first motherboard 100 is cut to form a first substrate 10 of a polymer liquid crystal dimming box 1, the second motherboard 110 is cut to form a second substrate 11 of the polymer liquid crystal dimming box 1. The first substrate 10 is a daughter board of the first motherboard 100, and the second substrate 11 is a daughter board of the second motherboard 110. There is a cutting area 19 at the junction of two adjacent daughter boards.

Exemplarily, please refer to FIGS. 6 and 7, a plurality of supporting pillars 15 and a plurality of virtual supporting pillars 17 are formed on the first motherboard 100 or the second motherboard 110 while forming the light-shielding structure 14. The supporting pillars 15 are disposed in the display area of the daughter board, the virtual supporting pillars 17 are disposed in the cutting area 19. The virtual supporting pillars are used to block the influence of ultraviolet light on the adjacent daughter boards in the case that the frame adhesive layers 13 of the other daughter boards are cured. In the embodiments of the present disclosure, the virtual supporting pillars 17 may be manufactured by the same process as the supporting pillars. Optionally, the virtual supporting pillars 17 are black supporting pillars.

Step S3: forming a frame adhesive layer 13 between the first motherboard 100 and the second motherboard 110 by coating.

Exemplarily, in the embodiments of the present disclosure, the material of the frame adhesive layer 13 is a non-transparent organic polymer material.

Step S4: forming a polymer liquid crystal layer 12 between the first motherboard 100 and the second motherboard 110 by dripping polymer liquid crystals, wherein the polymer liquid crystal layer is formed on one side of the light-shielding structure 14 away from the frame adhesive layer 13.

Exemplarily, the polymer liquid crystal layer 12 is formed by liquid crystal dripping, and the frame adhesive layers 13 and the polymer liquid crystal layers 12 of the plurality of daughter boards can be formed simultaneously by cutting the motherboard, which is beneficial to mass production.

It should be noted that in the embodiments of the present disclosure, the order of step S3 and step S4 may be exchanged.

Step S5: curing the frame adhesive layer 13 by ultraviolet irradiation.

Exemplarily, referring again to FIG. 7, the step S5 further includes:

Step S51: providing a UV mask 2, and disposing the UV mask 2 on one side of the polymer liquid crystal dimmer box 1. The UV mask includes a light-shielding area 21 and a light-transmitting area 22, wherein the light-shielding area 21 at least corresponds to an area where the polymer liquid crystal layer 12 and the light-shielding structure 14 are located, and the light-transmitting area 22 corresponds to an area where the frame adhesive layer 13 is disposed.

The light-shielding structure 14 is disposed between the frame adhesive layer 13 and the polymer liquid crystal layer 12 and surrounds the polymer liquid crystal layer 12. The light-shielding structure 14 can be used to absorb ultraviolet light obliquely incident during the curing process of the frame adhesive layer 13, so as to avoid the problem that the polymer liquid crystal is cured in advance due to irradiation of the ultraviolet light to the polymer liquid crystal layer 12, thereby improving the edge failure of the polymer liquid crystal dimming box 1.

It should be noted that the light-shielding area 21 corresponds to an area where the polymer liquid crystal layer 12, the light-shielding structure 14, and at least part of the frame adhesive layer 13 are located. That is, from a top view, the light-shielding layer 24 partially overlaps the frame adhesive layer 13, and the light shielding layer 24 covers and extends beyond an edge of the frame adhesive layer 13 close to the polymer liquid crystal layer 12. In this way, a part of the UV mask 2 extending beyond an edge of the polymer liquid crystal layer 12 can partially block the frame adhesive layer 13, and prevent ultraviolet light with a large incident angle from irradiating the polymer liquid crystal layer 12 through the gap between the frame adhesive layer 13 and the UV mask 2, thereby further avoiding the risk that the polymer liquid crystal layer 12 is cured in advance.

Exemplarily, the size range of the light-shielding layer 24 extending beyond the edge of the frame adhesive layer 13 close to the polymer liquid crystal layer 12 ranges from 50 microns to 100 microns, so that the risk that the polymer liquid crystal layer 12 is cured in advance can be reduced without affecting the curing effect of the frame adhesive layer 13.

Exemplarily, the distance between the UV mask 2 and the frame adhesive layer 13 in the vertical direction is 100 microns.

In some embodiments, the light-shielding layer 24 may be a single layer of black antireflective layer 242. In some embodiments, the light-shielding layer 24 may be a single layer of black low-refraction metal layer 241. In some embodiments, the light-shielding layer 24 may include a stack of a black low-refraction metal layer 241 and a black antireflective layer 242, wherein the black antireflective layer 242 is used to reduce the reflectivity of light on the surface of the black low-refraction metal layer 241.

Optionally, the material of the light-shielding layer 24 includes acrylic or acrylic resin adhesive.

Exemplarily, the thickness of the light-shielding layer 24 ranges from 2 microns to 3 microns.

Further, the UV mask 2 further includes a virtual light-shielding block 25 disposed on the substrate 20 and located in the cutting area 19 to block ultraviolet light incident on two adjacent daughter boards. The virtual light-shielding block 25 may be made of the same material as light-shielding layer 24. The width of the virtual light-shielding block 25 may be determined according to the actual spacing between two adjacent daughter boards. Exemplarily, the width of the virtual light-shielding block 25 is 50 microns.

Further, in some embodiments, please refer to FIG. 8, which differs from FIG. 7 in that the UV mask 2 further includes a substrate 20, and a light refraction layer 23 and a light-shielding layer 24 disposed on the substrate 20. The light refraction layer 23 is disposed in the light-transmitting area 22. The light-shielding layer 24 is disposed in the light-shielding area 21. The refractive index of the light refraction layer 23 is greater than 1. In this way, in the case that ultraviolet light with a large incident angle passes through the light refraction layer 23 with a high refractive index, it is refracted at the edge of the light refraction layer 23, thereby narrowing the angle of ultraviolet light, avoiding irradiation of the polymer liquid crystal layer 12, and further avoiding the risk the polymer liquid crystal layer 12 is cured in advance.

Step S6: curing the polymer liquid crystal layer 12.

Exemplarily, the polymer liquid crystal layer 12 may be cured by ultraviolet irradiation or heat curing.

Step S7: cutting the first motherboard 100 and the second motherboard 110 after they are paired along a cutting line to form a plurality of polymer liquid crystal dimming boxes 1.

Exemplarily, the polymer liquid crystal box includes a first substrate 10, a second substrate 11, a polymer liquid crystal layer 12, a frame adhesive layer 13, and a light-shielding structure 14. The second substrate 11 is disposed opposite to the first substrate 10. The polymer liquid crystal layer 12 is disposed between the first substrate 10 and the second substrate 11. The frame adhesive layer 13 is disposed between the first substrate 10 and the second substrate 11. The light-shielding structure 14 is disposed between the frame adhesive layer 13 and the polymer liquid crystal layer 12, and surrounds the polymer liquid crystal layer 12.

Figure 9:
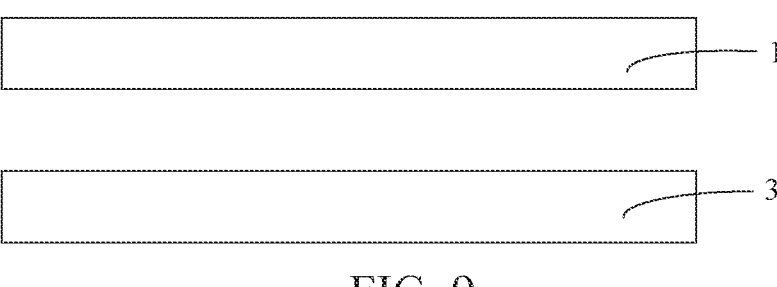
FIG. 9 is a schematic structural diagram of a display panel according to some embodiments of the present disclosure.

Referring to FIG. 9, the embodiments of the present disclosure further provide a display module including a display panel 3 and the polymer liquid crystal dimming box 1 provided in the above-described embodiments. The polymer liquid crystal dimming box 1 is disposed on a light-emitting side of the display panel 3. The display panel 3 has the technical features of the polymer liquid crystal dimming box 1 provided in any one of the embodiments of the present disclosure, and further has the technical effects of the polymer liquid crystal dimming box 1. For details, please refer to the above-mentioned specific embodiments, which are not described herein.

According to the polymer liquid crystal dimming box, the manufacturing method, and the display module of provided in the embodiments of the present disclosure, a light-shielding structure is disposed between a frame adhesive layer and a polymer liquid crystal layer, and the light-shielding structure surrounds the polymer liquid crystal layer, so as to absorb ultraviolet light obliquely incident during the curing process of the frame adhesive layer. In this way, the problem that the polymer liquid crystal layer is cured in advance due to ultraviolet light irradiation can be avoided, the edge failure of the polymer liquid crystal dimming box can be improved, which is conducive to mass production.

In the above-mentioned embodiments, the description of each embodiment has its own focus. For parts that are not described in detail in an embodiment, please refer to related descriptions of other embodiments.

In view of the foregoing, the polymer liquid crystal dimming box, manufacturing method thereof, and a display module provided in embodiments of the present disclosure have been described in detail above, and the principles and embodiments of the present disclosure are described by using specific examples herein. Descriptions of the above embodiments are merely intended to help understand the technical solutions and core ideas of the present disclosure. A person with ordinary skill in the art should understand that various modifications may still be made to the technical solutions described in the foregoing embodiments, or equivalents may be made to some of the technical features therein. These modifications or substitutions do not depart the essence of the corresponding technical solutions from the scope of the technical solutions of the examples of the present disclosure.

What is claimed is:

1. A polymer liquid crystal dimming box comprising:
a first substrate;
a second substrate disposed opposite to the first substrate;
a polymer liquid crystal layer disposed between the first substrate and the second substrate;
a frame adhesive layer disposed between the first substrate and the second substrate; and
a light-shielding structure disposed between the frame adhesive layer and the polymer liquid crystal layer and surrounding the polymer liquid crystal layer, and
wherein opposite side surfaces of the light-shielding structure in a stacking direction of the first substrate and the second substrate are in contact with the first substrate and the second substrate, respectively, and wherein there are gaps between the light-shielding structure and the frame adhesive layer.

2. The polymer liquid crystal dimming box according to claim 1, wherein the light-shielding structure comprises a plurality of light-shielding pillars disposed at intervals, each of the light-shielding pillars is annular and surrounds the polymer liquid crystal layer.

3. The polymer liquid crystal dimming box according to claim 2, wherein at least one supporting pillar is further disposed between the first substrate and the second substrate, the supporting pillar is disposed in the polymer liquid crystal layer, and the supporting pillar and the plurality of light-shielding pillars are disposed in the same layer.

4. The polymer liquid crystal dimming box according to claim 3, further comprising a dielectric layer filled between two adjacent ones of plurality of light-shielding pillars, wherein a refractive index of the dielectric layer is greater than a refractive index of the first substrate.

5. The polymer liquid crystal dimming box according to claim 2, wherein an optical density range of the light-shielding structure is greater than 2, and an optical density range of each of the plurality of light-shielding pillars is greater than 1.

6. The polymer liquid crystal dimming box according to claim 1, wherein the light-shielding structure comprises a first light-shielding layer close to the liquid crystal layer and a second light-shielding layer close to the frame adhesive layer, the first light-shielding layer comprises a plurality of first light-shielding pillars disposed at intervals, the second light-shielding layer comprises a plurality of second light-shielding pillars disposed at intervals, and the plurality of first light-shielding pillars and the plurality of second light-shielding pillars are alternately disposed.

7. The display panel according to claim 1, wherein the frame adhesive layer is transparent.

8. A method for manufacturing a polymer liquid crystal dimming box, comprising steps of:
forming a first motherboard and a second motherboard, and forming a light-shielding structure on the first motherboard or the second motherboard;
pairing the first motherboard and the second motherboard;
forming a frame adhesive layer between the first motherboard and the second motherboard by coating;
forming a polymer liquid crystal layer between the first motherboard and the second motherboard by dripping polymer liquid crystals, and the polymer liquid crystal layer being formed on one side of the light-shielding structure away from the frame adhesive layer;
curing the frame adhesive layer by ultraviolet irradiation;
curing the polymer liquid crystal layer; and
cutting the first motherboard and the second motherboard after they are paired along a cutting line to form a plurality of polymer liquid crystal dimming boxes, and wherein opposite side surfaces of the light-shielding structure in a stacking direction of the first motherboard and the second motherboard are in contact with the first motherboard and the second motherboard, respectively, and wherein there are gaps between the light-shielding structure and the frame adhesive layer.

9. The method according to claim 8, further comprising providing a UV mask, and disposing the UV mask on one side of the polymer liquid crystal dimmer box;
wherein the UV mask comprises a light-shielding area and a light-transmitting area, the light-shielding area at least corresponds to an area where the polymer liquid crystal layer and the light-shielding structure are located, and the light-transmitting area corresponds to an area where the frame adhesive layer is disposed; and
wherein the UV mask further comprises a substrate, and a light refraction layer and a light-shielding layer disposed on the substrate, wherein the light refraction layer is disposed in the light-transmitting area, the light-shielding layer is disposed in the light-shielding area, and a refractive index of the light refraction layer is greater than 1.

10. A display module, comprising:
a display panel; and
a polymer liquid crystal dimming box disposed on a light-emitting side of the display panel;

wherein the polymer liquid crystal dimming box comprises:

a first substrate;

a second substrate disposed opposite to the first substrate;

a polymer liquid crystal layer disposed between the first substrate and the second substrate;

a frame adhesive layer disposed between the first substrate and the second substrate; and a light-shielding structure disposed between the frame adhesive layer and the polymer liquid crystal layer and surrounding the polymer liquid crystal layer, and wherein opposite side surfaces of the light-shielding structure in a stacking direction of the first substrate and the second substrate are in contact with the first substrate and the second substrate, respectively, and wherein there are gaps between the light-shielding structure and the frame adhesive layer.

11. The display module according to claim 10, wherein the light-shielding structure comprises a plurality of light-shielding pillars disposed at intervals, each of the light-shielding pillars is annular and surrounds the polymer liquid crystal layer.

12. The display module according to claim 11, wherein at least one supporting pillar is further disposed between the first substrate and the second substrate, the supporting pillar is disposed in the polymer liquid crystal layer, and the supporting pillar and the plurality of light-shielding pillars are disposed in the same layer.

13. The display module according to claim 12, further comprising a dielectric layer filled between two adjacent ones of plurality of light-shielding pillars, wherein a refractive index of the dielectric layer is greater than a refractive index of the first substrate.

14. The display module according to claim 11, wherein an optical density range of the light-shielding structure is greater than 2, and an optical density range of each of the plurality of light-shielding pillars is greater than 1.

15. The display module according to claim 10, wherein the light-shielding structure comprises a first light-shielding layer close to the liquid crystal layer and a second light-shielding layer close to the frame adhesive layer, the first light-shielding layer comprises a plurality of first light-shielding pillars disposed at intervals, the second light-shielding layer comprises a plurality of second light-shielding pillars disposed at intervals, and the plurality of first light-shielding pillars and the plurality of second light-shielding pillars are alternately disposed.

16. The display module according to claim 10, wherein the frame adhesive layer is transparent.

* * * * *